United States Patent Office 3,515,196
Patented June 2, 1970

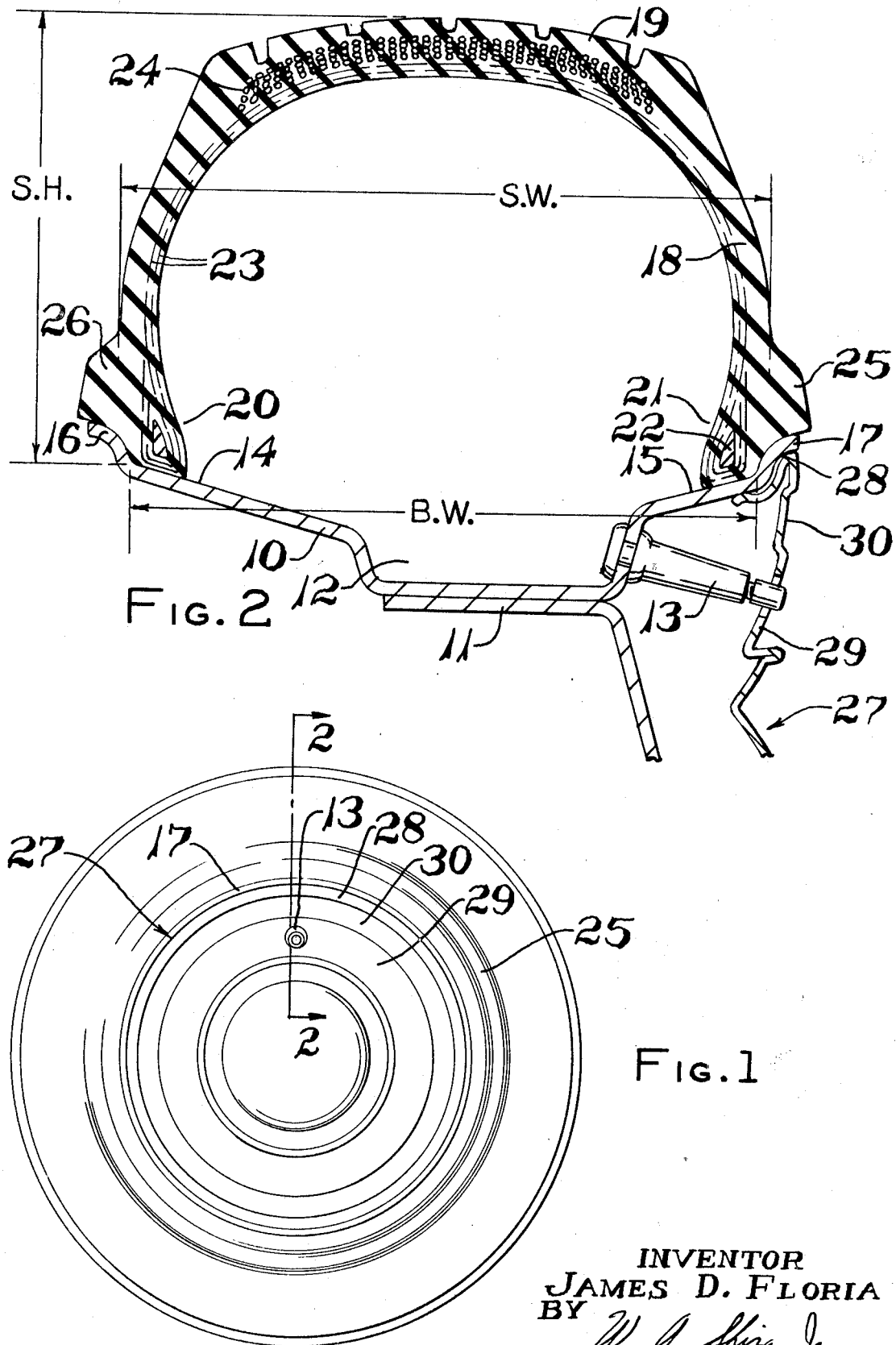

---

3,515,196
TIRE AND WHEEL FOR PASSENGER
AUTOMOBILES
James David Floria, Westport, Conn., assignor to The
B. F. Goodrich Company, New York, N.Y., a corporation of New York
Filed Nov. 21, 1967, Ser. No. 684,787
Int. Cl. B60c 3/00; B60b 7/00
U.S. Cl. 152—352
7 Claims

ABSTRACT OF THE DISCLOSURE

A tire and the combination thereof with a wheel for passenger automobiles permitting greater wheel diameter for a given tire peripheral-diameter and the use of the wheel cover to simulate the appearance of the lower sidewall portion of the tire as the result of the tire being of the radial type having a width at the beads not less than 90% of the tire section width, a tire section height not greater than 77.5% of the tire section width, and a laterally projecting sidewall rib contacting the wheel flange.

BACKGROUND OF THE INVENTION

The modern trend in styling of passenger automobiles has been toward smaller diameter wheels and lower profile tires. This has reduced the available space for brake drums with concomitant difficulties in providing adequate braking capacity. Also, the region of the tire sidewall available for styling treatment is reduced at a time when this portion of the vehicle is receiving increased styling attention.

One proposal, as embodied in U.S. Pats. 2,822,016 and 2,822,219, for meeting the diverse requirements of small diameter tire and wheel assemblies while maintaining adequate braking capacity was to provide a tire and wheel combination in which the tire had a laterally projecting rib adjacent the rim flange and the provision of a trim ring on the wheel, radially inwardly of the rim flange, to cooperate with the flange and rib in providing the appearance of the lower sidewall of the tire. This concept has the advantage of making possible larger braking drums by camouflaging a portion of the wheel as a part of the tire. Likewise, the provision of the trim ring permits styling changes by simply substituting for the trim ring of one external color or pattern another of different color or pattern.

This prior proposal did not, however, receive wide acceptance because the tires employed had carcasses of reinforcing cords extending at bias-angles which limited the distance the bead regions could be moved toward the maximum cross-sectional width of the tire and still retain the tire upon the rim. Furthermore, the web of the wheel was required to have a special configuration in order to accommodate the large brake drums so that wheels of conventional design could not be employed. Furthermore, the prior proposed tire and wheel structure, as disclosed in the aforementioned patents, did not lend itself readily to tires of the so-called "low profile" now currently in vogue.

SUMMARY OF THE INVENTION

In accordance with this invention the concept of employing a portion of the wheel cover to simulate in appearance the lower sidewall of a tire is achieved by the provision of an improved tire construction which permits the use of wheels of conventional design, the tire being so made that increased wheel diameter is possible without increasing the total diameter of the wheel and tire combination or the need for a special configuration of the wheel web. Furthermore, the improved construction provides a greater area of contact of the tire with the road as well as greater area for brake drums thereby increasing the overall safety of the vehicle equipped with the improved tire and wheel combination. Furthermore, the invention contemplates that the wheel cover will be of a nature and location such that this single member can serve to provide a decorative appearance simulating the lower sidewall of the tire and also cover the mounting bolts for the wheel so that the separate wheel cover and trim rings heretofore required can be consolidated with consequent saving of material and labor. Furthermore, the improved wheel and tire combination permits greater flexibility in style changes than have heretofore been possible, without need of replacement of the tire, and permits this to be achieved without the molding of special configurations within the tire sidewall.

The aforementioned advantages of the invention are made possible by employing a tire construction of the radial type, i.e. with the carcass reinforced by elastomer covered threads extending from bead to bead of the tire and with overhead reinforcement in the form of elastomer covered cords extending beneath the tread in directions oppositely disposed relative to the circumferential center line of the tire, the tire having the distance between the axially outer surfaces of the heel portions of the beads, when the tire is mounted upon a rim, not less than 90%, and preferably approximately 95.7%, of the transverse sectional width of the tire. The novel tire is further characterized as having the sectional height not greater than 77.5%, and preferably approximately 73.5%, of the sectional width and by the tire having a circumferentially extending rib of elastomer on the outer surfaces located immediately above the bead portion of the tire for engagement with the flange of the rim. Hence, the tire when mounted upon the rim and provided with a wheel cover removably secured to and extending over the outer side surface of the wheel cooperates with the marginal region of that cover to simulate the appearance of the lower sidewall portion of the tire. Preferably, the cover is provided with a decorative region in an annular band adjacent the wheel flange, which decorative band may be of a selective color with or without embossed or impressed configurations therein.

BRIEF DESCRIPTION OF THE DRAWINGS

FIG. 1 is a side elevational view of a passenger automobile wheel and tire incorporating this invention; and FIG. 2 is a fragmentary sectional view to an enlarged scale taken substantially on the section indicating line 2—2 of FIG. 1.

DETAILED DESCRIPTION

The presently preferred embodiment of the invention is illustrated in the drawings as embodied in a combined wheel and tire for a passenger automobile, the wheel being of the conventional drop-center type comprising a rim portion 10 and a central supporting web 11 which extends generally radially of the wheel and is provided with the usual holes for mounting bolts and opening for reception of the end of the wheel axle. The well 12 of the rim 10 has the outer sidewall thereof provided with an opening through which extends the conventional valve 13 for inflation of the tire carried by the rim. On either side of the rim well 12 are bead seats 14 and 15 the axially outer edges of which are turned generally radially outwardly to form bead retaining flanges 16 and 17.

The tire of this invention is of the radial construction and comprises a cord-reinforced, elastomer carcass 18 surmounted by an elastomer trend 19 the carcass terminating in spaced bead portions 20 and 21 each containing a circumferentially extending bead core 22. The cord reinforcement of the carcass includes one or more plies of elastomer covered reinforcing cords 23 extending in parallel relationship and in radial planes of the tire with the ends of these cords turned about the bead cores 22. The crown, or portion of the carcass beneath the tread 19, is provided with a plurality of elastomer covered reinforcing cords 24 extending in parallel relationship in at least two different directions relative to the circumferential center line of the tire. The construction thus far described is conventional and hence further details thereof need not be given.

The tire of this invention differs from prior constructions in that the sectional height, designated SH in FIG. 2 of the drawing, is materially less than in tires of like size of conventional construction. This is achieved by locating the bead cores 22 near the maximum sectional width of the tire, indicated by the dimension SW in FIG. 2, which sectional width is measured to the maximum laterally outer portions of the tire exclusive of the outwardly projecting ribs 25, hereinafter specifically described. The result of the reduced sectional height to width ratio is an increase in the bead width of the tire, designated BW in FIG. 2, without change in the sectional width. As a result of these changes in the bead width and sectional height, the resulting tire is of lower than conventional profile and greater bead width and hence has greatly increased lateral stability making for safer operation and facilitating cornering. Furthermore, by virtue of the changed dimensions of the cross section of the tire the tread width is increased and the tread radius also materially increased so that a larger area of the tread is in contact with the road than with tires of conventional construction of equal peripheral diameters and road radius.

The novel characteristics of a tire made in accordance with this invention can be more readily determined from the following tire data comparing a conventional 7.75–15 passenger car tire with a tire made in accordance with the presently preferred embodiment of this invention and which is designated as WBR:

|  | WBR | 7.75–15 |
| --- | --- | --- |
| Rim | 7 x 17JJ | 5½ x 15J |
| Tread width, in | 5.75 | 4.65 |
| Tread radius, in | 10.25 | 6.75 |
| Diameter, in | 27.73 | 27.74 |
| Section height, in | 5.37 | 6.37 |
| Section width, in | 7.31 | 7.31 |
| Deflection, in. at 1280#, 24 p.s.i | 1.24 | 1.25 |

It will be seen from the above data that, although the external diameter of the two tires is substantially the same, the bead width, BD, of the conventional 7.75–15 tire is only 5½ inches whereas the corresponding width of the tire made in accordance with this invention is 7 inches. This is represented in the above data by the first value of each of the rim dimensions which is the spacing of the rim flanges adjacent the bead seats. Furthermore, the rim diameter, the second value in each rim dimension, of the conventional construction is only 15 inches whereas the rim diameter of the wheel mounting a tire of this invention is 17 inches thus providing two additional inches for accommodation of brake drum not available with the conventional construction. The increased width of tread and greater tread radius of the tire of this invention, as compared to that of the conventional 7.75–15 tire, is illustrative of the increased area of the tire in contact with the road made possible by this construction and which is achieved without any increase in deflection under load.

In the presently preferred embodiment of the tire invention, the distance, BW, between the axial outer surfaces of the heel portions of the tire beads, when the tire is mounted upon a rim, is approximately 95.7% of the maximum cross-sectional width, SW, of the tire, and the sectional height, SH, of the tire is approximately 73.5% of the sectional width, SW. It will be apparent, however, that these values for one specific embodiment may be varied without departing from the principles of the invention. Thus, the distance between the axial outer surfaces of the heel portions of the bead when mounted upon the rim may be reduced from that of the presently preferred embodiment so long as this dimension is not less than 90% of the transverse sectional width of the tire. Also, the sectional height of the tire may be increased so long as it does not exceed 77.5% of the sectional width.

The tire of this invention, as noted above, is provided with a laterally projecting circumferentially extending rib 25 of elastomer on the outer sidewall adjacent the heel portion of the bead so that, when the tire is mounted upon the rim 10, the lower surface of this rib will contact the rim flange 17 and preferably extend laterally therebeyond as shown in FIG. 2. Preferably, both sides of the tire are symmetrical and are each provided with ribs 25, 26, respectively, although in some instances the rib 26 may be omitted. The rib 25 functions to protect the side of the tire and the rim flange from damage when a curb or other surface is encountered and, in addition, serves to limit rocking action of the bead 21 upon the bead seat 15.

The novel tire and wheel combination of this invention also preferably includes a wheel cover 27 which may be formed of sheet metal or suitable plastic. This cover extends from the rim flange 17 across the entire web and central region of the wheel with an appropriate opening being provided for accommodation of the valve 13. The cover 27 may be retained upon the wheel by any conventional means, such as clips or indentations, not shown, adjacent the central portion of the cover to engage raised portions upon the wheel as is well understood in the art. Alternatively, as shown in FIG. 2, the cover may be retained by having the periphery thereof received beneath a suitable surface or surfaces, such as a lip 28, on the radially inner surface of the wheel flange 17.

The region 29 of the wheel cover 27 adjacent the flange 17 preferably has a curvature equivalent to that of the tire sidewall exclusive of the rib 25 or is otherwise shaped to simulate the lower sidewall portion of the tire. This portion of the cover preferably has an annular band 30 thereon which is in an appropriate color and/or provided with other decorative media, such as embossed or indented patterns. The appearance of the tire and wheel may therefore be readily changed by substituting for one wheel cover 27 another of different decoration and/or configuration.

Although the invention has been described with specific reference to one preferred embodiment and certain variations thereof, it will be apparent that changes and modifications in the structure may be made in addition to those specifically recited.

I claim:
1. A pneumatic tire for passenger automobiles comprising a carcass surmounted by a tread portion and terminating in spaced bead portions each containing a bead core, the said carcass including one or more plies of elastomer covered reinforcing cords extending substantially in radial planes of the tire with the ends thereof turned about the bead cores, and a plurality of elastomer covered reinforcing cords extending in parallel relationship in at least two different directions relative to the circumferential center line of the tire beneath the tread thereof, the distance between the axially outer surfaces of the heel portions of the beads when the tire is mounted upon a rim being not less than 90% of the transverse sectional width of the tire and the sectional height of the tire being not greater than 77.5% of the sectional width of the tire.

2. A pneumatic tire as defined in claim 1 wherein the width of the tire at the axially outer surfaces of the heel portions of the beads is approximately 95.7% of the maximum cross-sectional width of the tire.

3. A pneumatic tire as defined in claim 1 wherein the sectional height is approximately 73.5% of the sectional width and the width at the axially outer surfaces of the heel portions of the beads is approximately 95.7% of the sectional width.

4. A pneumatic tire as defined in claim 1 further including a laterally projecting circumferentially extending rib of elastomer on the outer surface of at least one side of the tire so positioned that the radially inner surface of the rib is adapted to rest upon the outer edge of the adjacent flange of the rim upon which the tire is mounted.

5. A wheel and pneumatic tire for passenger automobiles, the said wheel comprising a rim portion with spaced seats for the beads of the tire and circumferentially extending bead-retaining flanges extending generally radially from the axially outer edges of said bead seats with the distance between the axially inner surfaces of the rim flanges being not less than 90% of the transverse sectional width of the tire and the sectional height of the tire being not greater than 77.5% of the sectional width of the tire, the said tire comprising a carcass surmounted by a tread portion and terminating in spaced bead portions resting upon said bead seats with the axially outer surfaces of the bead portions in engagement with the inner surfaces of said flanges, a bead core in each of said bead regions, one or more plies of elastomer covered reinforcing cords extending substantially in radial planes of the tire with the ends thereof turned about the bead cores, a plurality of elastomer covered reinforcing cords extending in parallel relationship in at least two different directions relative to the circumferential center line of the tire beneath the tread thereof, a laterally projecting circumferentially extending rib of elastomer on the outer surface of that side of the tire immediately above the portion of the tire engaging the outer of said rim flanges, and a wheel cover removably secured to and extending over the outer side surface of said wheel with the marginal region of said cover cooperating with the said side rib and adjacent rim flange to simulate the appearance of the lower sidewall portion of a tire.

6. A wheel and pneumatic tire as defined in claim 5 wherein the sectional height of the tire is approximately 73.5% of its sectional width and the width of the tire at the beads is approximately 95.7% of the sectional width.

7. A wheel and pneumatic tire as defined in claim 5 wherein the said removable cover has a decorative annular band thereon concentric with said rib and adjacent thereto.

References Cited

UNITED STATES PATENTS

| | | | |
|---|---|---|---|
| 2,447,021 | 8/1948 | Lyon | 301—37 |
| 2,640,730 | 6/1953 | Lyon | 301—37 |
| 2,822,016 | 2/1958 | Billingsley | 152—352 |

FOREIGN PATENTS

| | | |
|---|---|---|
| 378,852 | 8/1932 | Great Britain. |

ARTHUR L. LA POINT, Primary Examiner

C. B. LYON, Assistant Examiner

U.S. Cl. X.R.

301—37